Oct. 9, 1923.
E. L. ZUKOSKI
DETACHABLE LIFTER
Filed Aug. 1, 1921
1,469,868
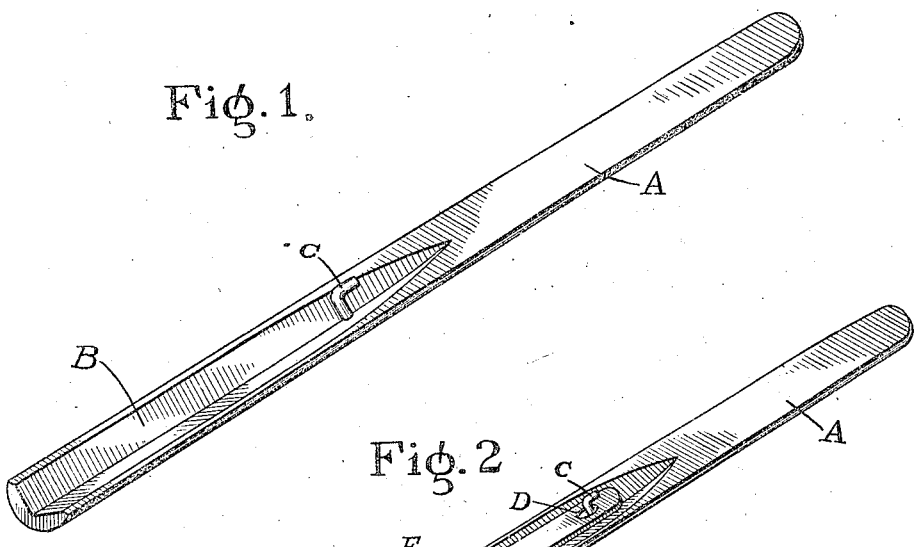
INVENTOR
Edmund L. Zukoski
BY John H. Kinealy
ATTORNEY Patented Oct. 9, 1923.

1,469,868

UNITED STATES PATENT OFFICE.

EDMUND L. ZUKOSKI, OF ST. LOUIS, MISSOURI.

DETACHABLE LIFTER.

Application filed August 1, 1921. Serial No. 488,880.

*To all whom it may concern:*

Be it known that I, EDMUND L. ZUKOSKI, a citizen of the United States, residing in the city of St. Louis, in the State of Missouri, have invented a new and useful Improvement in Detachable Lifters, of which the following is a full, clear, and exact specification, reference being had to the accompanying drawings, which form a part thereof.

My invention relates to lifters for pots, pans and the like, and it relates more particularly to detachable lifters made of non-conducting material and adapted for use with pans having metal handles with a hole near the outer end thereof.

Heretofore detachable lifters of various forms have been made, but in most cases they required the handle of the pan upon which they were used to be of special and peculiar construction; or the lifters were of such construction that they could not be readily engaged with the handle of an ordinary pan. Pans such as are ordinarily used for cooking are usually provided with a hole in the handle thereof so that the pan may be conveniently hung upon a hook or nail when not in use. One of the objects of my invention is to provide a detachable non-conducting lifter that engages the handle of a pan or the like through said hole.

Further objects of my invention are, to provide a detachable, non-conducting lifter which may be quickly and easily brought into engagement with the handle of a pan or the like; to provide a lifter which allows a person to remove or place a pan from or onto a stove without bringing the hands in proximity to the heat from said stove; and to provide a lifter that affords a cool hand grip at all times even though the handle of a pan with which the lifter is engaged is made hot when said pan is used for cooking upon or within a stove.

My invention is fully shown in the accompanying drawings where similar figures are used to designate similar parts. Fig. 1 is an enlarged perspective view of the lifter; Fig. 2 is a view of the lifter in engagement with the handle of an ordinary pan such as is used for cooking; Fig. 3 is a cross section of the lifter in engagement with the handle of a pan.

Referring to the figures, it is seen that the lifter consists of an elongated body comprising at one end a hand grip portion A, and at the other end an engaging portion having a recess B formed therein. Intermediate the grip portion A and the engaging portion, at or near the end of the recess B, there is placed a hooked projection C. The projection C is preferably formed of metal and provided, as shown in Fig. 3, with a T-head G whereby the projection is held in position on the lifter. The projection C is attached to the lifter so that the horizontal portion of the hook thereof projects towards the grip portion A and, preferably, in line with the axis of the lifter. The recess B is preferably made with outwardly flaring plane sides.

The ordinary metal pan or the like F used for cooking is provided with a metal handle E which has near its outer end a perforation or hole D whereby the pan may be hung on a hook or nail when not in use. To use the lifter the hook projection C is passed through the hole D of the handle of the pan, as shown in Fig. 2, and the handle E of the pan is engaged by the walls of the recess B, as shown in Fig. 3. When the lifter is grasped by the grip portion A and lifted, the hook of the projection C engages with that part of the handle E lying beyond the hole D and thus prevents the outer end of the handle E from being raised out of the recess when the lifter is raised. The walls of the recess B prevent the handle E from being displaced transversely of the lifter, while the projection C prevents the handle from being displaced longitudinally thereof. The hook of the projection C is preferably made small enough so that it may be easily and quickly passed through the hole D, so that the lifter may be easily engaged or disengaged with or from the handle of a pan to be lifted.

The lifter is preferably made of wood or some similar non-conducting material, although it is not necessary that the engaging portion shall be made of non-conducting material, as it will suffice if only the grip portion A be made of non-conducting material. The projection C is preferably inserted in the recess B at a short distance from the outer end thereof so that the lifter may be used on pans having short handles, and the recess B is preferably made fairly wide so that the lifter may be used with handles of considerable variation in width.

By making the lifter entirely of wood it is possible to produce a device whereby hot pans may be handled with ease and dispatch without burning or heating the hand, and the same lifter may be used with pans of wide divergence of handle widths.

What I claim as new and desire to secure by Letters Patent, is:

1. The combination with a utensil having a handle with a hole near its outer end, of a detachable lifter consisting of an elongated body comprising a grip portion at one end and an engaging portion at the other end, means intermediate said portions adapted to pass through said hole and engage the upper surface of said handle, and means whereby said engaging portion of said lifter is maintained in alined relation beneath said handle.

2. The combination with a utensil having a handle with a hole near its outer end, of a detachable lifter consisting of an elongated body comprising a grip portion at one end and an engaging portion at the other end, a hook intermediate said portions adapted to pass upwardly through said hole and engage the upper surface of said handle, and means whereby said engaging portion of said lifter is maintained in alined relation beneath said handle.

3. The combination with a utensil having a handle with a hole near its outer end, of a detachable lifter consisting of an elongated body comprising a non-conducting grip portion at one end and an engaging portion at the other end, means intermediate said portions adapted to pass upwardly through said hole and engage the upper surface of said handle, and a recess in said engaging portion adapted to receive said handle whereby said handle is maintained in alined position with said engaging portion.

4. The combination with a utensil having a metal handle with a hole near its outer end, of a detachable lifter consisting of an elongated wooden body comprising a grip portion at one end and an engaging portion at the other end, a hook intermediate said portions adapted to pass upwardly through said hole and engage the upper surface of said handle, and a recess in said engaging portion adapted to receive said handle whereby said handle is maintained in alined relation with said lifter.

In witness whereof I have signed my name to this specification.

EDMUND L. ZUKOSKI.